US008976698B2

(12) United States Patent
Chen et al.

(10) Patent No.: US 8,976,698 B2
(45) Date of Patent: Mar. 10, 2015

(54) METHODS AND APPARATUS FOR RADIO LINK MONITORING IN NEW CARRIER TYPE (NCT) IN A LONG TERM EVOLUTION (LTE) SYSTEM

(71) Applicant: QUALCOMM Incorporated, San Diego, CA (US)

(72) Inventors: Wanshi Chen, San Diego, CA (US); Tao Luo, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 13/761,807

(22) Filed: Feb. 7, 2013

(65) Prior Publication Data

US 2014/0043988 A1 Feb. 13, 2014

Related U.S. Application Data (60) Provisional application No. 61/681,419, filed on Aug. 9, 2012.

(51) Int. Cl.
*H04W 4/00* (2009.01)
*H04W 24/00* (2009.01)
(Continued)

(52) U.S. Cl.
CPC ............. *H04W 24/00* (2013.01); *H04L 1/0026* (2013.01); *H04L 5/0048* (2013.01)
USPC ............................ 370/252; 370/329; 370/341

(58) Field of Classification Search
None
See application file for complete search history.

(56) References Cited

U.S. PATENT DOCUMENTS

2011/0275394 A1 11/2011 Song et al.
(Continued)

FOREIGN PATENT DOCUMENTS

| CN | 102685795 A | 9/2012 |
| WO | 2012061765 A1 | 5/2012 |
| WO | 2012115366 A1 | 8/2012 |

OTHER PUBLICATIONS

Huawei et al., "Details of CSI-RS Based Received Signal Quality Measurements", 3GPP Draft; R1-121949, 3rd Generation Partnership Project (3GPP), Mobile Competence Centre; 650, Route Des Lucioles; F-06921 Sophia-Antipolis Cedex; France, vol. RAN WG1, no. Prague, Czech Republic; 20120521-20120525, May 12, 2012, XP050600250 [retrieved on May 12, 2012].

(Continued)

*Primary Examiner* — Chi H Pham
*Assistant Examiner* — Soon-Dong D Hyun
(74) *Attorney, Agent, or Firm* — Patterson & Sheridan, L.L.P.

(57) ABSTRACT

Certain aspects provide methods and apparatus for performing radio link monitoring (RLM) based on channel state information reference signals (CSI-RSs). Such RLM may be performed for certain carriers, such as New Carrier Type (NCT) in a Long Term Evolution (LTE) system, for example, in which reference signals conventionally used for RLM (e.g., common reference signals (CRSs) in LTE Rel-8/9/10) are not available in every subframe. Radio link failure (RLF) may be declared based on the RLM. One example method generally includes determining at least one of a first set of CSI-RS resources for use in channel estimation to perform RLM measurements or a second set of CSI-RS resources for use in interference estimation to perform the RLM measurements and performing the RLM measurements based on the one or more determined sets of CSI-RS resources. Certain aspects provide methods and apparatus for performing radio resource management (RRM) based on CSI-RSs.

50 Claims, 6 Drawing Sheets (51) Int. Cl.
*H04J 3/14* (2006.01)
*H04L 1/00* (2006.01)
*H04L 5/00* (2006.01)

(56) References Cited

U.S. PATENT DOCUMENTS

| | | | | |
|---|---|---|---|---|
| 2012/0122472 | A1* | 5/2012 | Krishnamurthy et al. | 455/456.1 |
| 2012/0176939 | A1* | 7/2012 | Qu et al. | 370/255 |
| 2013/0033998 | A1* | 2/2013 | Seo et al. | 370/252 |
| 2013/0194950 | A1* | 8/2013 | Haghighat et al. | 370/252 |
| 2013/0223271 | A1* | 8/2013 | Huang et al. | 370/252 |
| 2013/0294359 | A1* | 11/2013 | Lee | 370/329 |
| 2013/0308595 | A1* | 11/2013 | Ratasuk et al. | 370/330 |
| 2014/0112180 | A1* | 4/2014 | Axmon et al. | 370/252 |
| 2014/0153526 | A1* | 6/2014 | Mazzarese | 370/329 |

OTHER PUBLICATIONS

Intel Corporation: "Discussions on Reference Symbol Design for New Carrier Types", 3GPP Draft; R1-121532_Discussionsonreferencesymboldesignfornewcarriertype, 3rd Generation Partnership Project (3GPP), Mobile Competence Centre; 650, Route Des Lucioles; F-06921 Sophia-Antipolis Cedex; France, vol. RAN WG1, no. Jeju Island, Korea; 20120326-20120330, Mar. 20, 2012, XP050599805 [retrieved on Mar. 20, 2012].

International Search Report and Written Opinion—PCT/US2013/025330—ISA/EPO—May 17, 2013.

LG Electronics: "Synchronization Aspects of Extension Carrier", 3GPP Draft; R1-120422 Extension Carrier_Sync, 3rd Generation Partnership Project (3GPP), Mobile Competence Centre; 650, Route Des Lucioles; F-06921 Sophia-Antipolis Cedex; France, vol. RAN WG1, no. Dresden, Germany; 20120206-20120210, Jan. 31, 2012, XP050562911 [retrieved on Jan. 31, 2012].

New Postcom: "Considerations on Measurement for Additional Carrier Types", 3GPP Draft; R1-113701_Considerations on Measurement for Additional Carrier Types, 3rd Generation Partnership Project (3GPP), Mobile Competence Centre; 650, Route Des Lucioles; F-06921 Sophia-Antipolis Cedex; France, vol. RAN WG1, no. San Francisco, USA; 20111114-20111118, Nov. 10, 2011, XP050562373 [retrieved on Nov. 10, 2011].

\* cited by examiner

METHODS AND APPARATUS FOR RADIO LINK MONITORING IN NEW CARRIER TYPE (NCT) IN A LONG TERM EVOLUTION (LTE) SYSTEM

CLAIM OF PRIORITY UNDER 35 U.S.C. §119

This application claims benefit of U.S. Provisional Patent Application Ser. No. 61/681,419, entitled "Methods and Apparatus for Radio Link Monitoring in New Carrier Type (NCT) in a Long Term Evolution (LTE) System" and filed Aug. 9, 2012, which is herein incorporated by reference.

BACKGROUND

I. Field

Certain aspects of the present disclosure generally relate to wireless communications and, more particularly, to methods and apparatus for radio link monitoring (RLM) in New Carrier Type (NCT) in a Long Term Evolution (LTE) system.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

Certain aspects of the present disclosure generally relate to performing radio link monitoring (RLM) based on channel state information reference signals (CSI-RSs). This type of RLM may be performed, for example, for certain carriers, such as New Carrier Type (NCT) in Long Term Evolution (LTE), in which reference signals typically used for RLM (e.g., common reference signals (CRSs) in LTE Rel-8/9/10) are not available in every subframe. Radio link failure (RLF) may be declared based on the RLM.

In an aspect of the disclosure, a method for wireless communications by a user equipment (UE) is provided. The method generally includes determining at least one of a first set of CSI-RS resources for use in channel estimation to perform RLM measurements or a second set of CSI-RS resources for use in interference estimation to perform the RLM measurements and performing the RLM measurements based on the one or more determined sets of CSI-RS resources.

According to certain aspects, at least one or more portions of the first set of CSI-RS resources are received in a downlink (DL) subframe using a new carrier type (NCT) in which common reference signals (CRSs) are not transmitted in at least a subset of DL subframes. For certain aspects, the RLM measurements are performed based on a set of resources different than the first and second sets of CSI-RS resources. For certain aspects, the method further includes declaring a radio link failure (RLF) based on the RLM measurements and on performance of a corresponding control channel or a shared data channel, wherein at least one of the first or second set of CSI-RS resources is based on one or more bandwidth portions associated with the control channel or the shared data channel.

In an aspect of the disclosure, an apparatus for wireless communications is provided. The apparatus generally includes means for determining at least one of a first set of CSI-RS resources for use in channel estimation to perform RLM measurements or a second set of CSI-RS resources for use in interference estimation to perform the RLM measurements and means for performing the RLM measurements based on the one or more determined sets of CSI-RS resources.

In an aspect of the disclosure, a computer program product for wireless communications is provided. The computer program product generally includes a computer-readable medium having code for determining at least one of a first set of CSI-RS resources for use in channel estimation to perform RLM measurements or a second set of CSI-RS resources for use in interference estimation to perform the RLM measurements and for performing the RLM measurements based on the one or more determined sets of CSI-RS resources.

In an aspect of the disclosure, an apparatus for wireless communications is provided. The apparatus generally includes a processing system configured to determine at least one of a first set of CSI-RS resources for use in channel estimation to perform RLM measurements or a second set of CSI-RS resources for use in interference estimation to perform the RLM measurements and to perform the RLM measurements based on the one or more determined sets of CSI-RS resources. The apparatus may also include a receiver, which is typically configured to receive (a channel within) a subframe.

In an aspect of the disclosure, a method for wireless communications by a UE is provided. The method generally includes determining a set of CSI-RS resources for use in interference estimation to perform the RLM measurements and performing the RLM measurements based on the determined set of CSI-RS resources.

In an aspect of the disclosure, a method for wireless communications by a UE is provided. The method generally includes determining at least one of a first set of CSI-RS resources for use in channel estimation to perform radio resource management (RRM) measurements or a second set of CSI-RS resources for use in interference estimation to perform the RRM measurements and performing the RRM measurements based on the one or more determined sets of CSI-RS resources.

In an aspect of the disclosure, an apparatus for wireless communications is provided. The apparatus generally includes a processing system configured to determine at least one of a first set of CSI-RS resources for use in channel estimation to perform RRM measurements or a second set of CSI-RS resources for use in interference estimation to perform the RRM measurements and to perform the RRM measurements based on the one or more determined sets of CSI-RS resources.

In an aspect of the disclosure, an apparatus for wireless communications is provided. The apparatus generally includes means for means for determining at least one of a first set of CSI-RS resources for use in channel estimation to perform RRM measurements or a second set of CSI-RS resources for use in interference estimation to perform the RRM measurements and means for performing the RRM measurements based on the one or more determined sets of CSI-RS resources.

In an aspect of the disclosure, a computer program product for wireless communications by a UE is provided. The computer program product generally includes a computer-readable medium having code for determining at least one of a first set of CSI-RS resources for use in channel estimation to perform RRM measurements or a second set of CSI-RS resources for use in interference estimation to perform the RRM measurements; and for performing the RRM measurements based on the one or more determined sets of CSI-RS resources.

Numerous other aspects are provided including methods, apparatus, systems, computer program products, and processing systems.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

An Example Wireless Communication System

Figure 1:
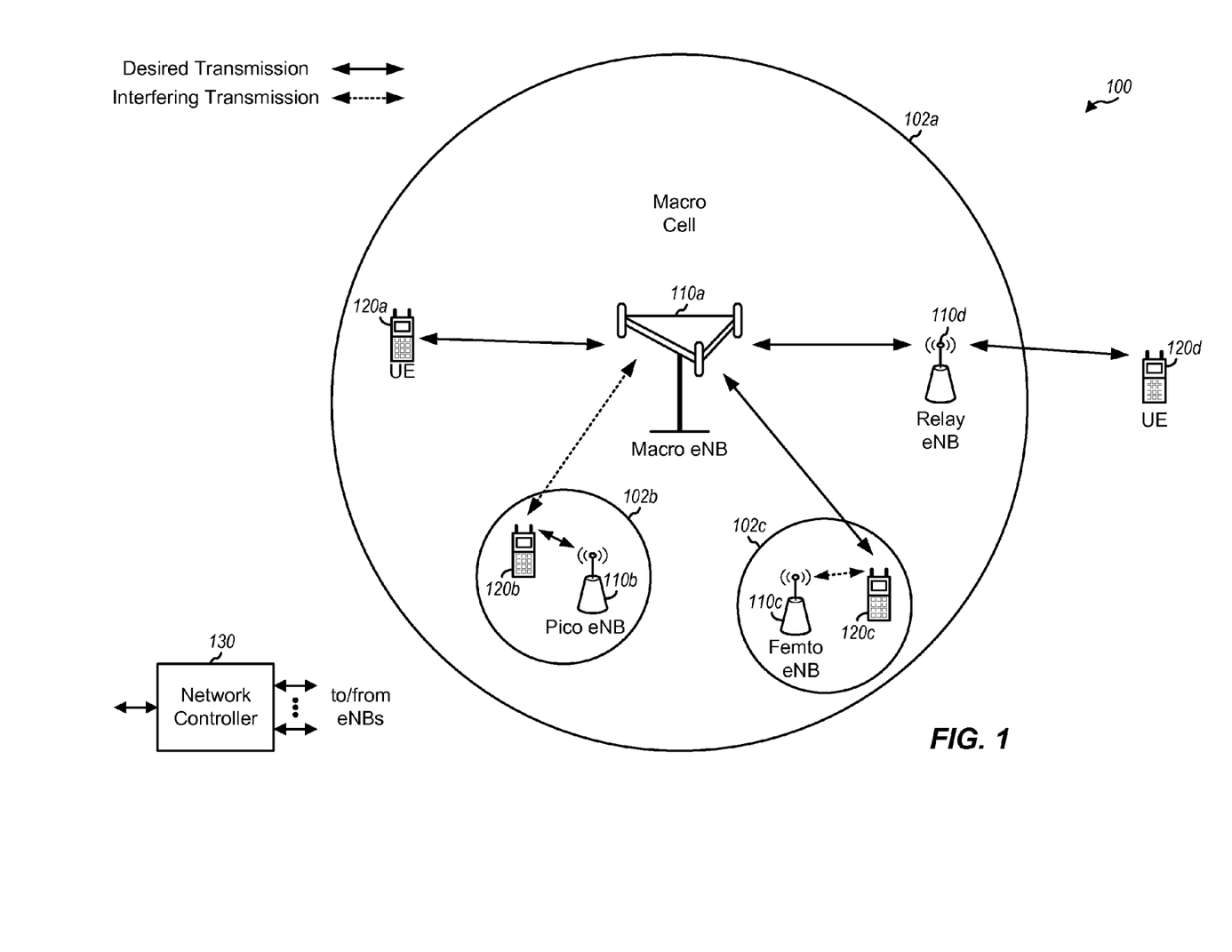
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB," "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, etc.

Figure 2:
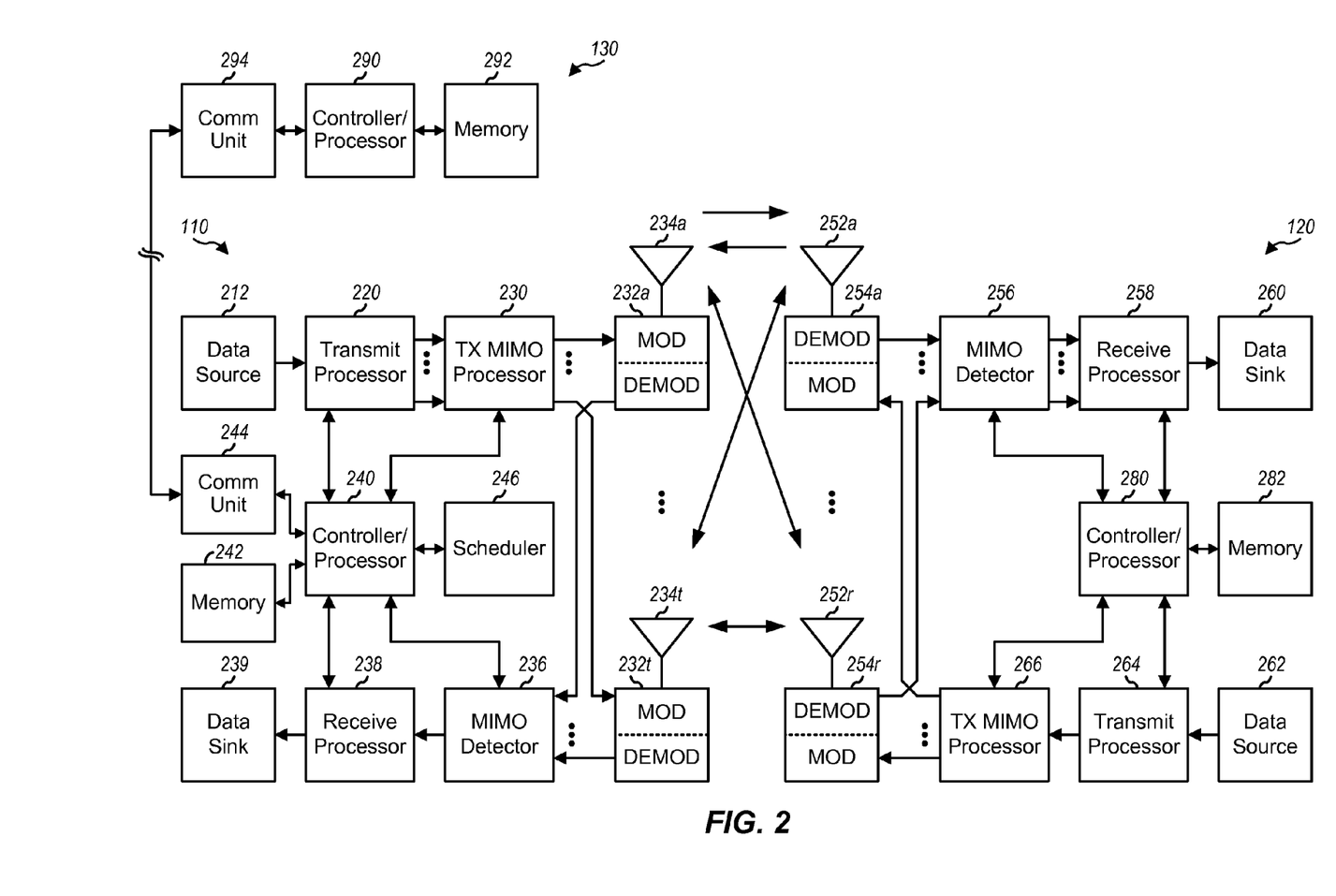
FIG. 2 is a block diagram conceptually illustrating an example of an evolved node B (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

As will be described in further detail below, when transmitting data to the UE 120 the base station 110 may be configured to determining a bundling size based at least in part on a data allocation size and precode data in bundled contiguous resource blocks of the determined bundling size, wherein resource blocks in each bundle are precoded with a common precoding matrix. That is, reference signals such as UE-RS and/or data in the resource blocks are precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
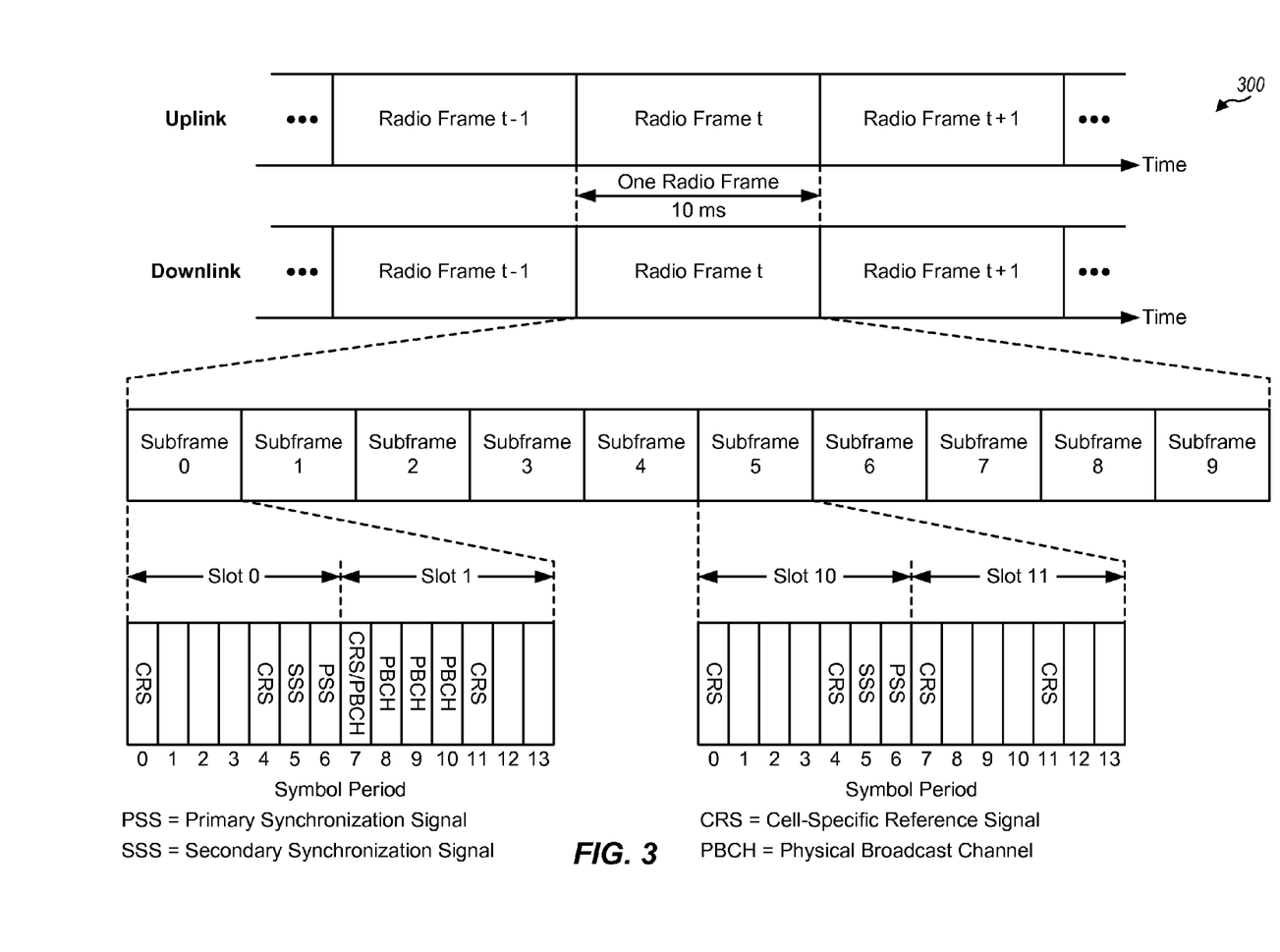
FIG. 3 is a block diagram conceptually illustrating an example of a frame structure in a wireless communications network, in accordance with certain aspects of the present disclosure.

FIG. 3 shows an example frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2 L symbol periods in each subframe may be assigned indices of 0 through 2 L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Example Radio Link Monitoring

In LTE Rel-8/9/10, for example, the physical downlink control channel (PDCCH) may be located in the first several symbols of a subframe. PDCCH may be fully distributed across the entire system bandwidth. PDCCH may be time division multiplexed with the physical downlink shared channel (PDSCH). Effectively, in LTE Rel-8/9/10, for example, a subframe may be divided into a control region and a data region.

In LTE Rel-11, for example, a new control channel (e.g., enhanced PDCCH (ePDCCH)) may be introduced. Unlike the legacy PDCCH, which occupies the first several control symbols in a subframe, ePDCCH may occupy the data region, similar to PDSCH. ePDCCH may help increase control channel capacity, support frequency-domain inter-cell interference coordination (ICIC), achieve improved spatial reuse of control channel resources, support beamforming and/or diversity, operate on the new carrier type (NCT) and in multimedia broadcast single frequency network (MBSFN) subframes, and coexist on the same carrier as legacy UEs.

Figure 4:
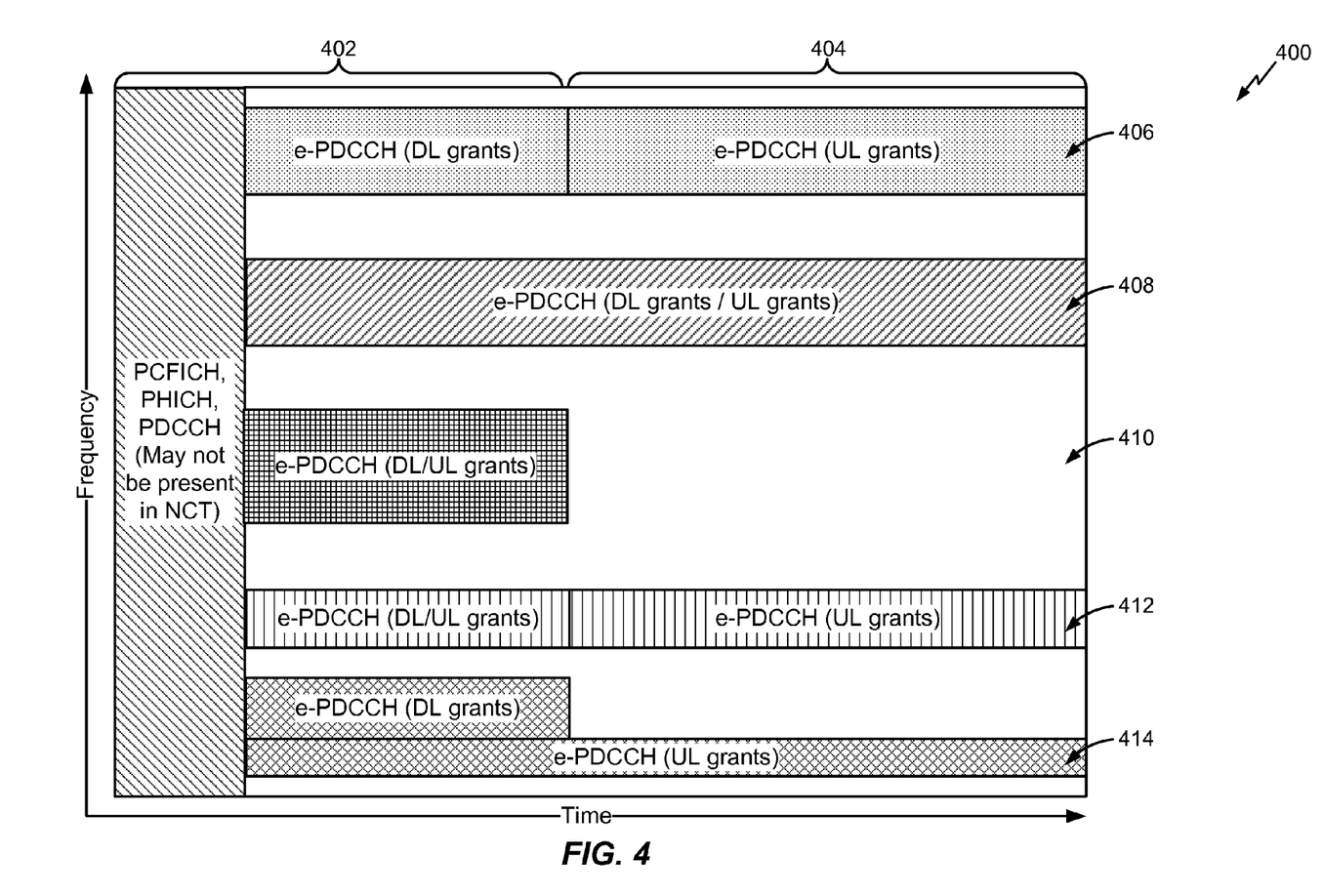
FIG. 4 illustrates an example subframe with various options for an enhanced physical downlink control channel (ePDCCH), in accordance with certain aspects of the present disclosure.

FIG. 4 illustrates an example subframe 400 with various options for ePDCCH, in accordance with certain aspects of the present disclosure. The subframe 400 is divided into a first slot 402 and a second slot 404, wherein each slot typically comprises 7 symbols in LTE for the normal cyclic prefix (CP) case. Each subframe in LTE spans 1 ms, and therefore, each slot has a duration of 0.5 ms. The first 3 symbols of the subframe 400 may be used for the Physical Control Format Indicator Channel (PCFICH), the Physical HARQ Indicator Channel (PHICH), and the PDCCH. Various ePDCCH structures are available for conveying information in the subframe 400, as illustrated. Both localized and distributed transmission of the enhanced control channel may be supported.

According to a first alternative 406, the ePDCCH may be transmitted similarly to transmission of a relay PDCCH (R-PDCCH). In this case, DL grants may be transmitted in the first slot 402, and UL grants may be transmitted in the second slot 404. For certain aspects, the second slot 404 may be used for downlink data transmission if it is not being used for transmission of UL grants.

According to a second alternative 408, the ePDCCH may be transmitted in a pure FDM scheme, where DL grants and UL grants span the resource block. As shown, a set of resources in the frequency domain are allocated for transmission of the ePDCCH across a time domain comprising the first and second time slots 402, 404. For certain aspects, a subset of RBs multiplexed in the frequency domain with the PDSCH are allocated for transmitting the ePDCCH including both uplink and downlink grants across the first and second time slots 402, 404.

According to a third alternative 410, the ePDCCH may be transmitted in the first slot 402 according to a TDM scheme, where DL and UL grants are transmitted in the first slot. As illustrated for the third alternative 410, the remaining RBs may be utilized for transmitting the PDSCH data transmissions.

According to a fourth alternative 412, the ePDCCH may be transmitted in a manner similar to R-PDCCH, where DL and UL grants may be transmitted in the first slot 402, and UL grants may be transmitted in the second slot 404. For certain aspects, if a DL grant is transmitted in a first physical resource block (PRB) of a given PRB pair, then a UL grant may be transmitted in a second PRB of the PRB pair. Otherwise, a UL grant may be transmitted in either the first or second PRB of the PRB pair.

According to a fifth alternative 414, the ePDCCH may be transmitted using TDM for DL grants in the first slot 402 and FDM for UL grants spanning the first and second slots 402, 404.

In LTE Rel-12 and beyond, for example, New Carrier Type (NCT) is introduced, which need not be backward compatible with prior releases of LTE. With NCT, common reference signals (CRSs) may only be present in a subset of downlink (DL) subframes (e.g., only in every 5 subframes) in an effort to reduce DL overhead, provide energy savings for the eNB, etc. The CRSs for NCT may be limited to one antenna port only and may be narrowband (e.g., instead of occupying the entire system bandwidth). The NCT may be standalone or associated with a backward compatible carrier as part of carrier aggregation. The NCT may not have the legacy control region, at least not in some subframes (if not in all subframes). The NCT may completely rely on ePDCCH (and potentially the enhanced PCFICH (ePCFICH)/ePHICH (enhanced PHICH), etc., for example) for control signaling, or control from another carrier.

Radio link monitoring (RLM) is a measurement function for ensuring that UEs maintain time synchronization and can receive their control information reliably. In LTE, UEs may evaluate the quality of the serving cell's downlink (DL) continuously and ensure that they are time-synchronized to the serving cell. RLM may include both out-of-synchronization (OOS) and in-synchronization (IS) evaluation procedures in which a UE monitors common reference signal (CRS) quality of the serving cell in the presence of co-channel interference. OOS and IS are defined as events where the block error rates (BLERs) of hypothetical PDCCH transmissions corresponding to predetermined control payloads exceed pre-specified thresholds. If a UE's serving cell is not the strongest cell, the magnitude and variance of its interference may be large. Such a UE may potentially declare a radio link failure (RLF), leading to wireless connection loss, if the UE's detected OOS events are persistent.

As described above, radio link monitoring is based on PDCCH performance for legacy carriers. Since PDCCH demodulation is based on CRSs, the actual RLM procedure involves the UE measuring CRS and mapping the measured CRS quality to PDCCH performance. For NCT, however, ePDCCH is based on demodulation reference signals (DM-RSs). DM-RS for a UE is not always present and may or may not be precoded. Accordingly, what is needed are techniques and apparatus for performing RLM (and potentially declaring RLF) in NCT. For certain aspects, NCT may employ resources—which are originally intended for a first purpose—for a second purpose. For certain aspects, NCT may employ resources—which are traditionally employed for a first purpose—for a second purpose.

Although the following description focuses on RLM, the same techniques may also apply for radio resource management (RRM). For example, RRM may be informed of reference signal received power (RSRP) and/or reference signal received quality (RSRQ). For RSRP, the measurement may be performed based on the received power of the resource elements that carry CSI-RS within a measurement frequency bandwidth. For RSRQ, the measurement may be performed based on RSRP and a received signal strength indicator (RSSI), which is based on a total received power observed in one or more OFDM symbols containing CSI-RS within a measurement bandwidth. The measurement of RSRP may be based on a first set of CSI-RSs, and the measurement of RSSI may be based on a second set of CSI-RSs. The measurement frequency bandwidth may be the same as the downlink system bandwidth, or a fraction thereof. As an example, the measurement frequency bandwidth may be the center 6 resource blocks. For ease of description, however, only RLM will be discussed below.

Figure 6:
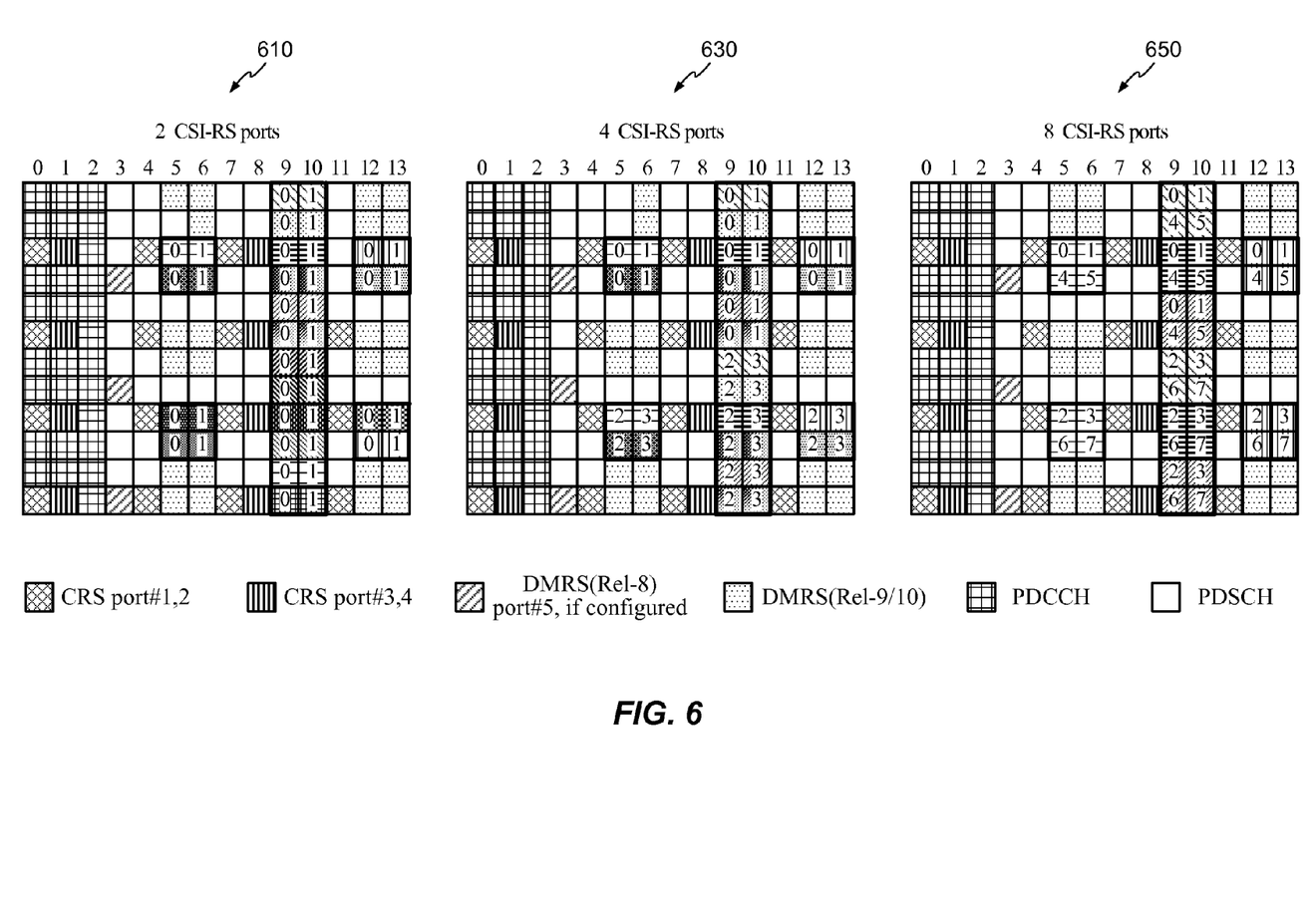
FIG. 6 illustrates example reference signal (RS) patterns for 2, 4, and 8 CSI-RS ports, according to an aspect of the present disclosure.

Currently in LTE, channel state information reference signals (CSI-RSs) are used for the following purposes: (A) CSI-RS for channel estimation for channel state information (CSI) feedback; (B) CSI-RS for interference estimation for CSI feedback; and (C) CSI-RS for coordinated multipoint (CoMP) set management. FIG. 6 illustrates example reference signal (RS) configurations 610, 630, and 650 in LTE Rel-9 or Rel-10, for example, for the normal CP for 2, 4, and 8 CSI-RS ports, respectively, where the DM-RS or CSI-RS configuration is constructed using either 1×2 blocks or 2×2 blocks. In addition to these current uses, certain aspects of the present disclosure support using CSI-RS for radio link monitoring (RLM), as well: (D) CSI-RS for channel estimation for RLM and/or (E) CSI-RS for interference estimation for RLM. Based on CSI-RS resources for D and E, a UE may perform channel and/or interference estimation (e.g., to derive control channel signal-to-noise ratio (SNR)). As used herein, channel estimation generally refers to determining the transfer function of a wireless channel (typically for CSI feedback purposes) based on transmission of known pilot or reference signals, whereas interference estimation generally refers to determining interference (e.g., from other neighboring eNBs).

Note that D may not be necessary, if set A can be reused. As an example, the CSI-RS resources of set D may be the same as those of set A. As another example, set D may reuse a subset of the resources defined for A (e.g., only one of the antenna ports specified in A, and/or only a subset of subframes specified in A). Generally, however, measurements for E may typically be performed (e.g., B may not be easily reused for E), since CSI feedback and RLM have different constraints and/or operations. Alternatively, E may reuse one default set from B, with or without some restrictions, (e.g., only a subset of the CSI-RS subframes in set B is applied for E). The resources of set D (e.g., if separately defined) and/or set E may have different antenna ports, periodicity, etc. from those defined for set A and/or set B, respectively. The channel for RLM may be based on distributed ePDCCH only or other channels (e.g., localized ePDCCH, PDSCH, etc.).

For certain aspects, multiple sets of resources may be defined for the UE to perform RLM (e.g., for either or both channel estimation and interference estimation for RLM). In one alternative, one or more sets of CSI-RS resources may be configured for D and/or E. For example, each set of CSI-RS resources may have different virtual cell IDs for UEs in CoMP. In another alternative, in addition to CSI-RSs for D and E, one or more other channels may be designated or defined for RLM (e.g., primary synchronization signal (PSS)/secondary synchronization signal (SSS)-based, 1-port CRS-based, etc.). Some combination of these alternatives may also be used for RLM. Additionally or alternatively, the channel for RLM may be based on distributed ePDCCH, localized ePDCCH, PDSCH, or a combination thereof, as described above.

For certain aspects, a UE may be aware of two or more sets of resources for RLM. For example, if the UE is configured with two or more sets for RLM, there is a question how to perform RLM (e.g., how to determine whether RLF has occurred based on multiple radio link quality results). For certain aspects, some logic may be implemented to select between or combine (e.g., statistically) the two or more measured radio link qualities (e.g., taking the max or the min or using some mapping function). One possible design criterion may be that if the UE can maintain radio link quality at least with one link, it is useful to keep the UE in the nominal connected mode rather than declaring RLF (e.g., assuming that ePDCCH may come from any cell in the virtual cell ID set).

For certain aspects, the frequency location for RLM may not occupy the entire system bandwidth. If ePDCCH performance, for example, is used as the benchmark for a RLF declaration, and given that ePDCCH may be transmitted only in a fraction of system bandwidth, the frequency location for RLM thus may be based on the corresponding fraction of system bandwidth. For CSI-RS-based RLM, configurations D and/or E may further be restricted to some portion of system bandwidth. Such portion of system bandwidth may or may not be physically contiguous (e.g., in light of the fact that the ePDCCH resources may or may not be physically contiguous). The location of the fraction of system bandwidth may be explicitly signaled or implicitly derived (e.g., based on ePDCCH resource location). For CSI-RS configurations A and B for CSI feedback, the frequency location may be separately defined from configurations D and E. This is because A and B are mainly for PDSCH operation, such that the frequency location for A and B may be the entire bandwidth.

Figure 5:
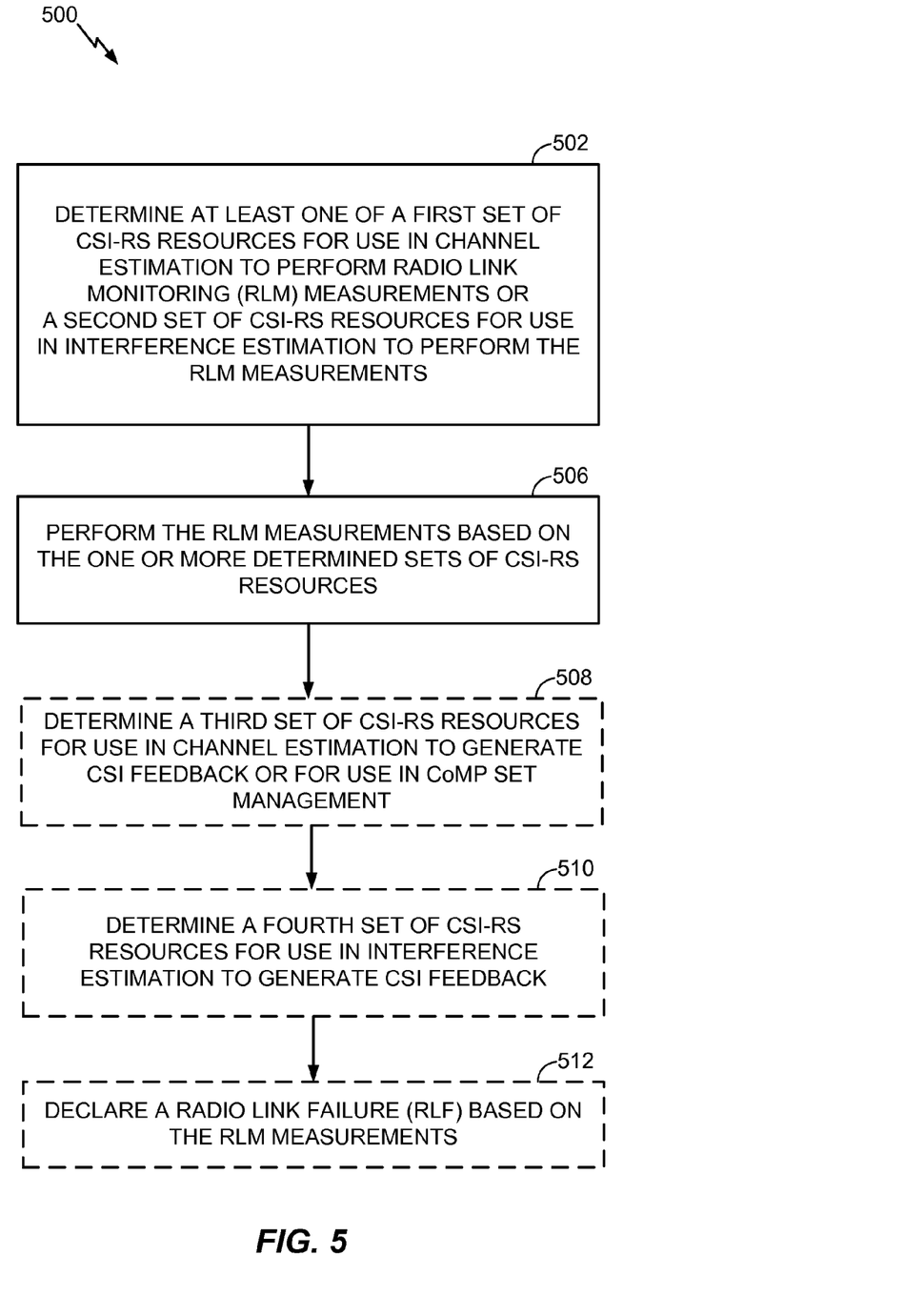
FIG. 5 illustrates example operations for performing radio link monitoring (RLM) measurements based on a set of channel state information reference signal (CSI-RS) resources, in accordance with certain aspects of the present disclosure.

FIG. 5 illustrates example operations 500 for performing RLM measurements based on a set of CSI-RS resources, in accordance with certain aspects of the present disclosure. The operations 500 may be performed, for example, by a UE. The operations 500 may begin, at 502, with the UE determining at least one of a first set (e.g., a first configuration, such as an antenna port configuration or a resource pattern configuration) of CSI-RS resources for use in channel estimation to perform RLM measurements (e.g., CSI-RS resources for D above, which may be at least a subset of A) or a second set (e.g., a second configuration) of CSI-RS resources for use in interference estimation to perform the RLM measurements (e.g., CSI-RS resources for E above). For certain aspects, a bandwidth of the first or second set of CSI-RS resources is a fraction of a system bandwidth. At 506, the UE may perform the RLM measurements based on the one or more determined sets of CSI-RS resources (e.g., the at least one of the first or second set).

According to certain aspects, at least one or more portions of the first set of CSI-RS resources are received in a downlink (DL) subframe using a new carrier type (NCT). In the NCT, common reference signals (CRSs) are not transmitted in at least a subset of DL subframes.

At 508, the UE may, for certain aspects, determine a third set (e.g., a third configuration) of CSI-RS resources for use in channel estimation to generate channel state information (CSI) feedback or for use in coordinated multipoint (CoMP) set management. According to certain aspects, the first and third sets of CSI-RS resources at least partially overlap. For certain aspects, the first set of CSI-RS resources includes at least a subset of a portion of the third set of CSI-RS resources used for performing channel estimation for the CSI feedback. The first set may be determined based on the third set of CSI-RS resources. For certain aspects, the first set of CSI-RS resources corresponds to a subset of the third set of CSI-RS resources associated with at least one of a reduced number of antenna ports or a reduced number of subframes carrying CSI-RS.

At 510, the UE may determine a fourth set (e.g., a fourth configuration) of CSI-RS resources for use in interference estimation to generate CSI feedback. The second and the fourth sets of CSI-RS resources may be separately indicated to the UE. According to certain aspects, the second and the fourth sets of CSI-RS resources at least partially overlap. The second set of CSI-RS resources may include at least a subset of a portion of the fourth set of CSI-RS resources used for performing interference estimation for the CSI feedback. One or more portions of the second set of CSI-RS resources may have at least one of different antenna ports or periodicity from one or more portions of the fourth set of CSI-RS resources used for performing interference estimation for the CSI feedback. For certain aspects, the determination at 510 may be in addition to or an alternative to the determination at 508.

At 512, the UE may declare a radio link failure (RLF) based on the RLM measurements. For certain aspects, the RLF declaration may also be based on performance of a corresponding control channel or a shared data channel. The control channel may be a distributed enhanced physical downlink control channel (ePDCCH) or a localized ePDCCH, for example, while the shared data channel may be a physical downlink shared channel (PDSCH). At least one of the first or second set of CSI-RS resources may be based on one or more bandwidth portions associated with the control channel or the shared data channel. For certain aspects, the one or more bandwidth portions are explicitly or implicitly signaled to the UE.

According to certain aspects, performing the RLM measurements at 506 further includes performing the RLM measurements based on a set of resources different than the first and second sets of CSI-RS resources. The set of resources (different than the first and second sets of CSI-RS resources) may include at least one of primary synchronization signal (PSS)-based resources, secondary synchronization signal (SSS)-based resources, common reference signal (CRS) resources, or a third set (e.g., a third configuration) of CSI-RS resources different than the first and second sets of CSI-RS resources, for example. At least the first or second set of CSI-RS resources may be associated with a different cell identifier than the third set of CSI-RS resources. For certain aspects, each cell identifier is a virtual cell identifier. For certain aspects, performing the RLM measurements at 506 includes selecting between (or mathematically combining): (1) a first radio link quality measured based on the one or more determined sets of CSI-RS resources and (2) a second radio link quality measured based on the set of resources (different than the first and second sets of CSI-RS resources). For certain aspects, the selecting involves favoring maintenance of a radio link over declaration of a radio link failure (RLF).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the figures, those operations may be performed by any suitable corresponding counterpart means-plus-function components.

For example, means for transmitting may comprise a transmitter (e.g., a modulator 254) and/or an antenna 252 of the UE 120 illustrated in FIG. 2. Means for receiving may comprise a receiver (e.g., a demodulator 254) and/or an antenna 252 of the UE 120 illustrated in FIG. 2. Means for processing, means for performing RLM measurements, means for declaring RLF, or means for determining may comprise a processing system, which may include at least one processor, such as the receive processor 258, the controller/processor 280, and/or the transmit processor 264 of the UE 120 illustrated in FIG. 2. However, additional or alternative components in FIG. 2 may be employed as the means for receiving, means for determining, and/or means for processing.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    determining at least one of a first set of channel state information reference signal (CSI-RS) resources for use in channel estimation to perform radio link monitoring (RLM) measurements or a second set of CSI-RS resources for use in interference estimation to perform the RLM measurements, wherein at least one or more portions of the first set of CSI-RS resources are received in a downlink (DL) subframe using a new carrier type (NCT) in which common reference signals (CRSs) are not transmitted in at least a subset of DL subframes; and
    performing the RLM measurements based on the one or more determined sets of CSI-RS resources.

2. The method of claim 1, further comprising determining a third set of CSI-RS resources for use in channel estimation to generate channel state information (CSI) feedback or for use in coordinated multipoint (CoMP) set management.

3. The method of claim 2, wherein the first and third sets of CSI-RS resources at least partially overlap.

4. The method of claim 3, wherein the first set of CSI-RS resources includes at least a subset of a portion of the third set of CSI-RS resources used for performing channel estimation for the CSI feedback.

5. The method of claim 3, wherein the first set of CSI-RS resources is determined based on the third set of CSI-RS resources and wherein the first set of CSI-RS resources corresponds to a subset of the third set of CSI-RS resources associated with at least one of a reduced number of antenna ports or a reduced number of subframes carrying CSI-RS.

6. The method of claim 1, further comprising determining a third set of CSI-RS resources for use in interference estimation to generate channel state information (CSI) feedback.

7. The method of claim 6, wherein the second and third sets of CSI-RS resources are separately indicated to the UE.

8. The method of claim 6, wherein the second and third sets of CSI-RS resources at least partially overlap.

9. The method of claim 6, wherein the second set of CSI-RS resources includes at least a subset of a portion of the third set of CSI-RS resources used for performing interference estimation for the CSI feedback.

10. The method of claim 6, wherein one or more portions of the second set of CSI-RS resources have at least one of different antenna ports or periodicity from one or more portions of the third set of CSI-RS resources used for performing interference estimation for the CSI feedback.

11. The method of claim 1, further comprising declaring a radio link failure (RLF) based on the RLM measurements and on performance of a corresponding control channel or a shared data channel.

12. The method of claim 11, wherein the control channel comprises a distributed enhanced physical downlink control channel (ePDCCH) or a localized ePDCCH.

13. The method of claim 11, wherein at least one of the first or second set of CSI-RS resources is based on one or more bandwidth portions associated with the control channel or the shared data channel.

14. The method of claim 13, wherein the one or more bandwidth portions are explicitly or implicitly signaled.

15. The method of claim 1, wherein performing the RLM measurements further comprises performing the RLM measurements based on a set of resources different than the first and second sets of CSI-RS resources.

16. The method of claim 15, wherein the set of resources different than the first and second sets of CSI-RS resources comprises at least one of primary synchronization signal (PSS)-based resources, secondary synchronization signal (SSS)-based resources, common reference signal (CRS) resources, or a third set of CSI-RS resources different than the first and second sets of CSI-RS resources.

17. The method of claim 16, wherein at least one of the first or second set of CSI-RS resources is associated with a different cell identifier than the third set of CSI-RS resources.

18. The method of claim 15, wherein performing the RLM measurements comprises selecting between or mathematically combining a first radio link quality measured based on the one or more determined sets of CSI-RS resources and a second radio link quality measured based on the set of resources different than the first and second sets of CSI-RS resources.

19. The method of claim 18, wherein the selecting comprises favoring maintenance of a radio link over declaration of a radio link failure (RLF).

20. The method of claim 1, wherein a bandwidth of the first or second set of CSI-RS resources is a fraction of a system bandwidth.

21. An apparatus for wireless communications, comprising:
a processing system: and
a storage medium coupled to the processing system storing codes that when executed by the processing system cause the apparatus to:
determine at least one of a first set of channel state information reference signal (CSI-RS) resources for use in channel estimation to perform radio link monitoring (RLM) measurements or a second set of CSI-RS resources for use in interference estimation to perform the RLM measurements, wherein at least one or more portions of the first set of CSI-RS resources are received in a downlink (DL) subframe using a new carrier type (NCT) in which common reference signals (CRSs) are not transmitted in at least a subset of DL subframes; and
perform the RLM measurements based on the one or more determined sets of CSI-RS resources.

22. The apparatus of claim 21, wherein the processing system is further configured to determine a third set of CSI-RS resources for use in channel estimation to generate channel state information (CSI) feedback or for use in coordinated multipoint (CoMP) set management.

23. The apparatus of claim 22, wherein the first and third sets of CSI-RS resources at least partially overlap.

24. The apparatus of claim 23, wherein the first set of CSI-RS resources includes at least a subset of a portion of the third set of CSI-RS resources used for performing channel estimation for the CSI feedback.

25. The apparatus of claim 23, wherein the first set of CSI-RS resources is determined based on the third set of CSI-RS resources and wherein the first set of CSI-RS resources corresponds to a subset of the third set of CSI-RS resources associated with at least one of a reduced number of antenna ports or a reduced number of subframes carrying CSI-RS.

26. The apparatus of claim 21, wherein the processing system is further configured to determine a third set of CSI-RS resources for use in interference estimation to generate channel state information (CSI) feedback.

27. The apparatus of claim 26, wherein the second and third sets of CSI-RS resources are separately indicated to the apparatus.

28. The apparatus of claim 26, wherein the second and third sets of CSI-RS resources at least partially overlap.

29. The apparatus of claim 26, wherein the second set of CSI-RS resources includes at least a subset of a portion of the third set of CSI-RS resources used for performing interference estimation for the CSI feedback.

30. The apparatus of claim 26, wherein one or more portions of the second set of CSI-RS resources have at least one of different antenna ports or periodicity from one or more portions of the third set of CSI-RS resources used for performing interference estimation for the CSI feedback.

31. The apparatus of claim 21, wherein the processing system is further configured to declare a radio link failure (RLF) based on the RLM measurements and on performance of a corresponding control channel or a shared data channel.

32. The apparatus of claim 31, wherein the control channel comprises a distributed enhanced physical downlink control channel (ePDCCH) or a localized ePDCCH.

33. The apparatus of claim 31, wherein at least one of the first or second set of CSI-RS resources is based on one or more bandwidth portions associated with the control channel or the shared data channel.

34. The apparatus of claim 31, wherein the one or more bandwidth portions are explicitly or implicitly signaled.

35. The apparatus of claim 21, wherein the processing system is further configured to perform the RLM measurements by performing the RLM measurements based on a set of resources different than the first and second sets of CSI-RS resources.

36. The apparatus of claim 35, wherein the set of resources different than the first and second sets of CSI-RS resources comprises at least one of primary synchronization signal (PSS)-based resources, secondary synchronization signal (SSS)-based resources, common reference signal (CRS) resources, or a third set of CSI-RS resources different than the first and second sets of CSI-RS resources.

37. The apparatus of claim 36, wherein at least one of the first or second set of CSI-RS resources is associated with a different cell identifier than the third set of CSI-RS resources.

38. The apparatus of claim 35, wherein the processing system is configured to perform the RLM measurements by selecting between or mathematically combining a first radio link quality measured based on the one or more determined sets of CSI-RS resources and a second radio link quality measured based on the set of resources different than the first and second sets of CSI-RS resources.

39. The apparatus of claim 38, wherein the selecting comprises favoring maintenance of a radio link over declaration of a radio link failure (RLF).

40. The apparatus of claim 21, wherein a bandwidth of the first or second set of CSI-RS resources is a fraction of a system bandwidth.

41. An apparatus for wireless communications, comprising:
means for determining at least one of a first set of channel state information reference signal (CSI-RS) resources for use in channel estimation to perform radio link monitoring (RLM) measurements or a second set of CSI-RS resources for use in interference estimation to perform the RLM measurements, wherein at least one or more portions of the first set of CSI-RS resources are received in a downlink (DL) subframe using a new carrier type (NCT) in which common reference signals (CRSs) are not transmitted in at least a subset of DL subframes; and
means for performing the RLM measurements based on the one or more determined sets of CSI-RS resources.

42. A computer program product for wireless communications by a user equipment (UE), comprising:
a non-transitory computer-readable medium comprising code for:

determining at least one of a first set of channel state information reference signal (CSI-RS) resources for use in channel estimation to perform radio link monitoring (RLM) measurements or a second set of CSI-RS resources for use in interference estimation to perform the RLM measurements, wherein at least one or more portions of the first set of CSI-RS resources are received in a downlink (DL) subframe using a new carrier type (NCT) in which common reference signals (CRSs) are not transmitted in at least a subset of DL subframes; and performing the RLM measurements based on the one or more determined sets of CSI-RS resources.

43. A method for wireless communications by a user equipment (UE), comprising:

determining at least one of a first set of channel state information reference signal (CSI-RS) resources for use in channel estimation to perform radio resource management (RRM) measurements or a second set of CSI-RS resources for use in interference estimation to perform the RRM measurements, wherein at least one or more portions of the first set of CSI-RS resources are received in a downlink (DL) subframe using a new carrier type (NCT) in which common reference signals (CRSs) are not transmitted in at least a subset of DL subframes; and performing the RRM measurements based on the one or more determined sets of CSI-RS resources.

44. The method of claim 43, wherein the RRM measurements include at least one of reference signal received power (RSRP) or reference signal received quality (RSRQ) measurements.

45. An apparatus for wireless communications, comprising:

a processing system: and a storage medium coupled to the processing system storing codes that when executed by the processing system cause the apparatus to:

determine at least one of a first set of channel state information reference signal (CSI-RS) resources for use in channel estimation to perform radio resource management (RRM) measurements or a second set of CSI-RS resources for use in interference estimation to perform the RRM measurements, wherein at least one or more portions of the first set of CSI-RS resources are received in a downlink (DL) subframe using a new carrier type (NCT) in which common reference signals (CRSs) are not transmitted in at least a subset of DL subframes; and perform the RRM measurements based on the one or more determined sets of CSI-RS resources.

46. The apparatus of claim 45, wherein the RRM measurements include at least one of reference signal received power (RSRP) or reference signal received quality (RSRQ) measurements.

47. An apparatus for wireless communications, comprising:

means for determining at least one of a first set of channel state information reference signal (CSI-RS) resources for use in channel estimation to perform radio resource management (RRM) measurements or a second set of CSI-RS resources for use in interference estimation to perform the RRM measurements, wherein at least one or more portions of the first set of CSI-RS resources are received in a downlink (DL) subframe using a new carrier type (NCT) in which common reference signals (CRSs) are not transmitted in at least a subset of DL subframes; and means for performing the RRM measurements based on the one or more determined sets of CSI-RS resources.

48. The apparatus of claim 47, wherein the RRM measurements include at least one of reference signal received power (RSRP) or reference signal received quality (RSRQ) measurements.

49. A computer program product for wireless communications by a user equipment (UE), comprising:

a non-transitory computer-readable medium comprising code for:

determining at least one of a first set of channel state information reference signal (CSI-RS) resources for use in channel estimation to perform radio resource management (RRM) measurements or a second set of CSI-RS resources for use in interference estimation to perform the RRM measurements, wherein at least one or more portions of the first set of CSI-RS resources are received in a downlink (DL) subframe using a new carrier type (NCT) in which common reference signals (CRSs) are not transmitted in at least a subset of DL subframes; and performing the RRM measurements based on the one or more determined sets of CSI-RS resources.

50. The computer program product of claim 49, wherein the RRM measurements include at least one of reference signal received power (RSRP) or reference signal received quality (RSRQ) measurements.

* * * * *